H. PIERCE.
SPRING TIRE.
APPLICATION FILED OCT. 12, 1910.
998,798.
Patented July 25, 1911.
2 SHEETS—SHEET 1.
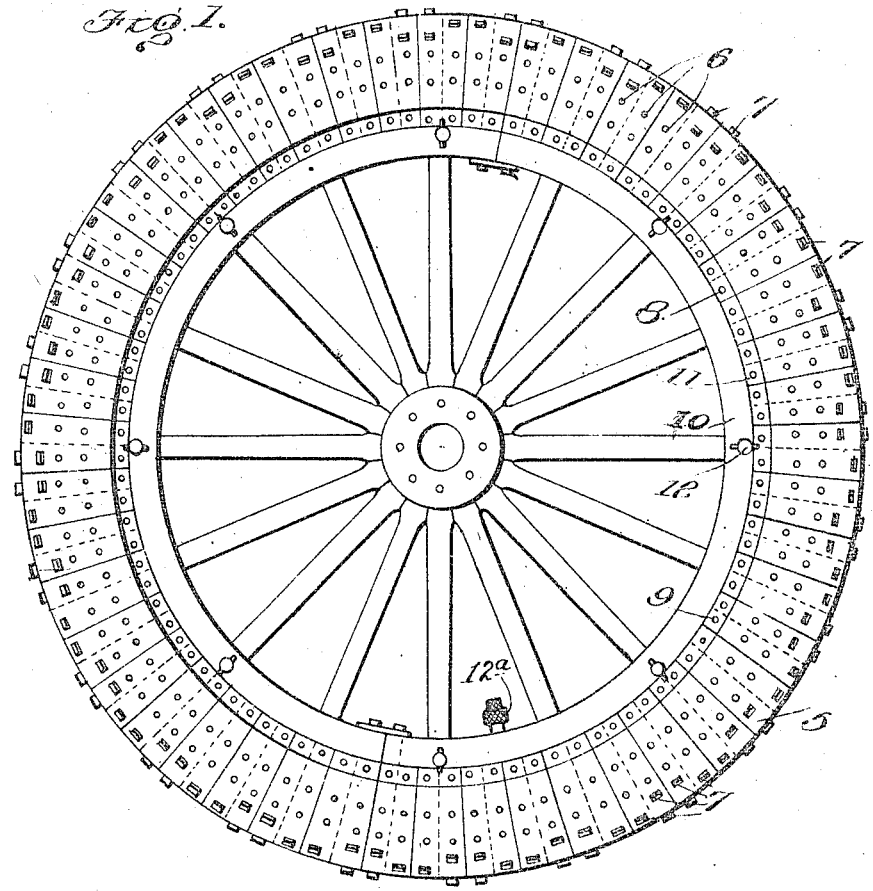
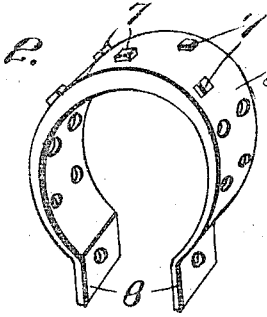
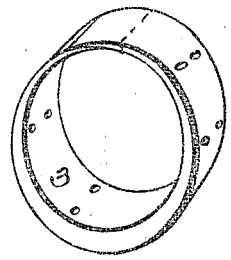
Witnesses
Inventor
Harry Pierce.
By _____, Attorneys.

H. PIERCE.
SPRING TIRE.
APPLICATION FILED OCT. 12, 1910.
998,798.
Patented July 25, 1911.
2 SHEETS—SHEET 2.
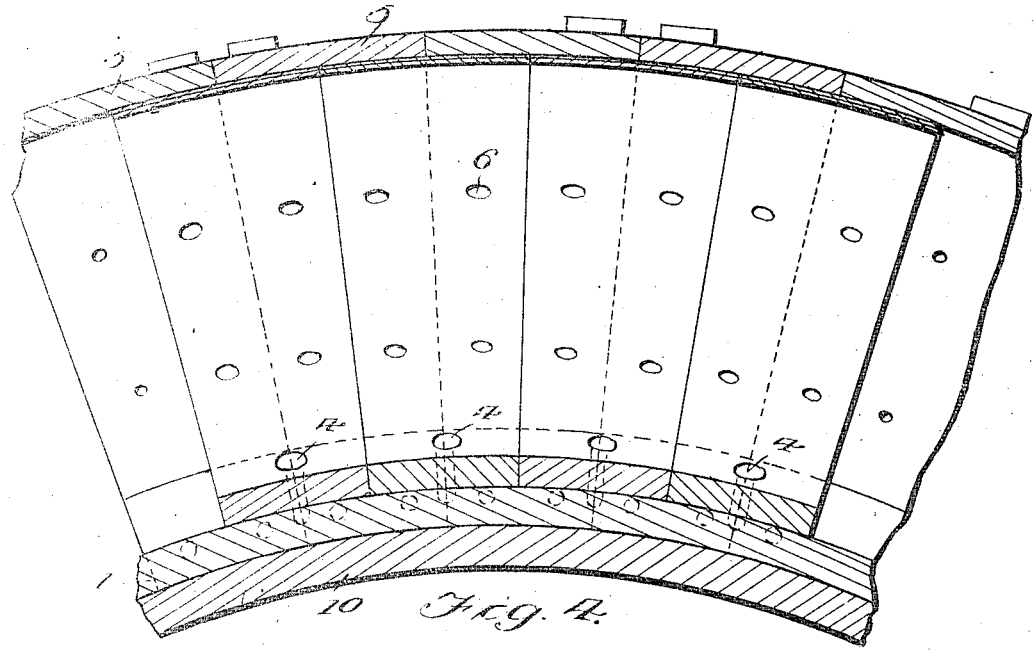
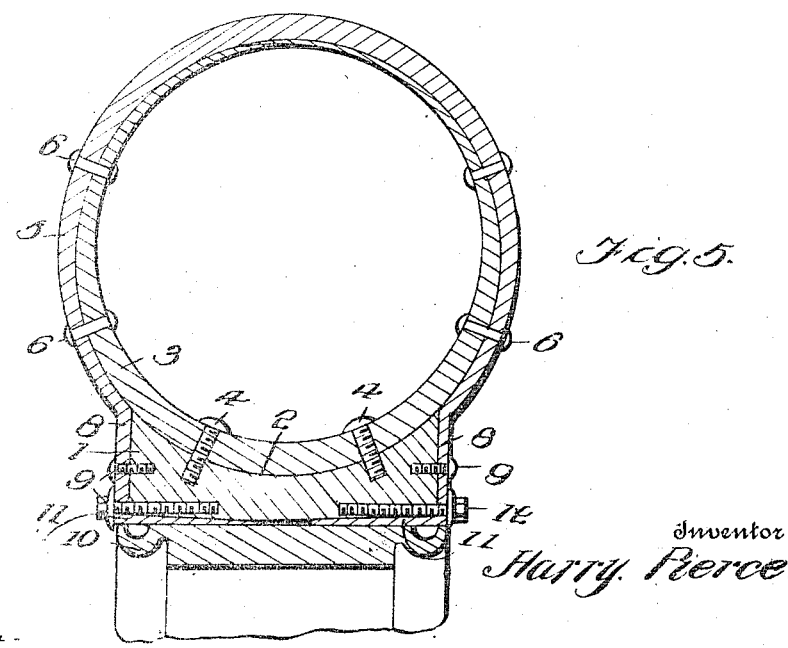

UNITED STATES PATENT OFFICE.

HARRY PIERCE, OF KANSAS CITY, MISSOURI, ASSIGNOR OF FORTY-NINE ONE-HUNDREDTHS TO GEORGE W. STROPE, OF KANSAS CITY, MISSOURI.

SPRING-TIRE.

998,798. Specification of Letters Patent. Patented July 25, 1911.

Application filed October 12, 1910. Serial No. 586,651.

*To all whom it may concern:*

Be it known that I, HARRY PIERCE, a citizen of the United States, residing at Kansas City, in the county of Jackson and State of Missouri, have invented certain new and useful Improvements in Spring-Tires, of which the following is a specification.

This invention comprehends certain new and useful improvements in resilient tires of that type that are designed to replace the ordinary rubber cushion or pneumatic tires that are so liable to become punctured or otherwise damaged and rendered unfit for use, and the invention has for its primary object an improved construction of spring tire for vehicle wheels, particularly automobiles or other self-propelled vehicles so arranged that it is applicable for attachment to any wheel that is built for the ordinary pneumatic or rubber cushion tires, as well as for newly constructed wheels.

The invention also has for its object a durable and efficient construction of spring tire which will be found very serviceable and not open to the objectionable features that are incidental to the use of the ordinary rubber tires, while at the same time it will possess the requisite characteristics of lightness and resiliency. And, the invention has for a still further object to generally improve this class of devices and to render them more commercially desirable.

With these and other objects in view as will more fully appear as the description proceeds, the invention consists in certain constructions, and arrangements of parts that I shall hereinafter fully describe and claim.

For a full understanding of the invention reference is to be had to the following description and accompanying drawings in which:—

Figure 1 is a side elevation of a wheel constructed in accordance with my invention. Figs. 2 and 3 are perspective views of the inner and outer springs that are employed. Fig. 4 is a longitudinal sectional view of a portion of the wheel of a tire, and Fig. 5 is a transverse sectional view thereof.

Corresponding and like parts are referred to in the following description and indicated in all the views of the accompanying drawings by the same reference characters.

My improved tire embodies a rim 1 which is preferably formed of steel, the outer face of said rim being transversely concave as indicated at 2 to accurately fit the inner springs 3. The springs 3 are preferably thickest at the middle and gradually taper toward both ends, as clearly illustrated in Fig. 5 and are so formed at their thicker middle portions that they snugly fit in the channel or recessed outer face of the rim 1, both in transverse and circumferential directions. The springs 3 may be of any desired width and are preferably so constructed, that is, tapered from their innermost to their outermost portions that their edges will abut, spring against spring, entirely around the circumference of the wheel. The springs 3 are secured to the rim 1 by screws or rivets 4, or other similar fastening devices, as may be desired, and their outer ends overlap, but without any permanent connection to each other.

My improved tire embodies in addition to the inner set of springs 3, a set of outer springs 5 which are preferably arranged with their edges abutting entirely around the tire, the springs 5 being transversely curved and of substantially circular shape, just like the springs 3, but being preferably thicker at the tread portion than at the rim. The springs 5 overlap and preferably regularly break joint with the inner springs 3 and are secured to the inner springs 3 by inner and outer rows of rivets, as indicated at 6. Preferably the outermost set of rivets at opposite sides of the tire are located some distance from the extreme tread portion, whereby the greatest resiliency of the tire will be found at the tread, the overlapped ends of the inner springs 3 giving the tire a leaf-spring effect from the non-skid surface 7 to the outermost sets of rivets 6. The non-skid portions 7 at the tread are formed by protuberances which are rolled or stamped in and thus form integral parts of the outer set of springs 5.

The inner ends of the outer springs 5 extend in offset relation to the main portions of said springs and are arranged parallel to each other, said ends designated 8, being secured to the opposite side edges of the rim 1 by screws 9, or similar fastening devices.

In order to secure the rim 1 to a rim 10 I provide wedge rings 11 which are forced in between the side edges of the rims 1 and 10 and held in place by any desired number of screws or bolts 12 which are threaded into the rim 1 at opposite sides thereof.

From the foregoing description in connection with the accompanying drawings, the operation of my improved resilient tire will be apparent. It is to be understood that both sets of springs are made to conform with the circle of the wheel as well as the circle of the tire transversely considered, the inside springs overlapping at their outer ends to any desired extent. This gives the tire a leaf-spring effect from the non-skid tread surface to the outermost sets of rivets 6, except of course, that each outside spring is reinforced by the two inside springs up to said rivets. If the wheel equipped with my invention be given a jolt or shock strong enough to collapse the springs sufficient to bend that part of the tire at the outermost rivets 6 then the tire would be reinforced by each connecting inside and outside spring to a considerable extent around the wheel, and such jar or shock would thereby impart to the first outside spring but very little movement.

It is to be understood that my improved tire is to be built in different weights and sizes, according to the different sizes of the wheels and the different loads the wheels are intended to carry, it being intended that my improved tires are to be practically the different sizes of the pneumatic tires now ordinarily employed, so that they may take the place of a single pneumatic tire or of a full set, and at the same time not change the size of the wheel or mar the look of the automobile or other vehicle. I also propose to provide a tube 12$^a$ to take the place of the ordinary inflation tube of the pneumatic tire, said tube being used to oil or lubricate the inside of the new spring tire to prevent rust and the like.

Having thus described the invention what is claimed as new is:—

A tire of the character described, comprising a rim formed with a transversely concave outer face, springs connected at middle portions to the concave face of the rim, said springs being thickest at the middle and tapering toward their ends which are disposed outermost and which freely overlap, said springs being set edge to edge around the rim and each transversely disposed relative to the rim, an outer set of springs overlapping and breaking joint with the innermost springs, the springs of the outer set having their thickest portions at the middle, said portions being disposed at the tread of the tire and gradually tapering toward their ends which are innermost and secured to the opposite side edges of the rim, and fastening devices connecting said springs together.

In testimony whereof, I affix my signature in presence of two witnesses.

HARRY PIERCE. [L. S.]

Witnesses:
   E. R. CORBETT,
   R. F. HULLAND.